United States Patent
Schmidt et al.

(10) Patent No.: US 6,843,364 B2
(45) Date of Patent: Jan. 18, 2005

(54) TOGGLE BAR LINK FOR CONVEYOR AND GUIDEWAY PANS AND TOGGLE BARS, TOGGLE BAR SOCKETS, SAFETY ELEMENTS, PANS AND ASSEMBLY TOOLS FOR TOGGLE BAR LINKS

(75) Inventors: Siegfried Schmidt, Bottrop (DE); Jorg Wirtz, Kamen (DE)

(73) Assignee: DBT GmbH, Lunen (DE)

( * ) Notice: Subject to any disclaimer, the term of this patent is extended or adjusted under 35 U.S.C. 154(b) by 0 days.

(21) Appl. No.: 09/801,166

(22) Filed: Mar. 7, 2001

(65) Prior Publication Data

US 2001/0020570 A1 Sep. 13, 2001

(30) Foreign Application Priority Data

Mar. 8, 2000 (DE) .......................................... 100 11 288

(51) Int. Cl.[7] .......................... B65G 19/18; B65G 19/28
(52) U.S. Cl. ................ 198/735.1; 198/735.2; 198/735.6
(58) Field of Search .......................... 198/735.1, 735.2, 198/735.6, 860.2, 861.2

(56) References Cited

U.S. PATENT DOCUMENTS

| 4,391,471 | A | * | 7/1983 | Hauschopp et al. | 198/735.1 |
| 4,607,890 | A | * | 8/1986 | Merten et al. | 198/735.1 |
| 4,813,747 | A | * | 3/1989 | Klimeck et al. | 198/735.6 |
| 5,033,604 | A | * | 7/1991 | Steinkuhl et al. | 198/735.6 |
| 5,224,582 | A | * | 7/1993 | Hahn et al. | 198/735.6 |

* cited by examiner

*Primary Examiner*—Gene O. Crawford
(74) *Attorney, Agent, or Firm*—Cook, Alex, McFarron, Manzo, Cummings & Mehler, Ltd.

(57) ABSTRACT

In a toggle bar link (100) for conveyor pans of conveyors or guideway pans of extraction machine guideways, with toggle bar sockets (1) arranged at the sides of the pans in whose socket cut-outs (3) a toggle bar can be inserted and retained by securing elements (4), both the toggle bar (2) and the securing elements (4) as well as the toggle bar sockets (1) are constructed intrinsically symmetrically and the toggle bar sockets (1) are arranged symmetrical to a plane of symmetry (S) running through the joint between the pans. Owing to the symmetrical construction of the individual parts they can not only be produced simply but also no orientation problems are posed in the assembly of the individual parts.

7 Claims, 3 Drawing Sheets

TOGGLE BAR LINK FOR CONVEYOR AND GUIDEWAY PANS AND TOGGLE BARS, TOGGLE BAR SOCKETS, SAFETY ELEMENTS, PANS AND ASSEMBLY TOOLS FOR TOGGLE BAR LINKS

THE FIELD OF THE INVENTION

The present invention relates to a toggle bar link for conveyor pans of conveyors, guideway pans of mining machine tracks and similar, with toggle bar sockets arranged at the sides of the pans, open to the side, in whose cut-outs a toggle bar can be inserted whose heads are joined in one piece by a shaft which is smaller in cross section and whose heads have locking lugs to secure the toggle bar in the toggle bar socket cut-outs by means of detachable securing elements. Since the toggle bar link has toggle bar sockets and toggle bars which are arranged on the pans and since detachable securing elements must be assembled for securing the toggle bars, the present invention also relates to toggle bar sockets, toggle bars, securing elements, the pan itself as well as an assembly tool for a corresponding toggle bar link.

Toggle bar links are primarily provided as conveyor pan links in scraper chain conveyors, which are preferred for use in underground mining operations. In these, the conveyor pans of the scraper chain conveyor are given tensile strength via the toggle bar links, but are mobile through a limited angle on all sides against each other, so as to permit the scraper chain conveyor to move in sections even over uneven ground. Toggle bar links are used also in underground mining operations to join mining machine guideways assembled from pans, especially of ploughs built onto scraper chain conveyors or plough chain guideways.

Previously proposed toggle bar links comprise toggle bars having toggle bar heads which are joined together as one piece by a shaft of smaller cross section. The toggle bars have tongue-shaped locking pins on the ends of the toggle bar heads away from the shaft, one of which is broader than the other. In a toggle bar link known from DE 295 02 953 A1 the broader locking pin engages behind a fixed locking surface of one toggle bar socket, whilst the narrower locking pin is secured by means of a detachable securing plate on the corresponding other toggle bar socket. The securing plate is made in such a fashion that it can be secured to the associated toggle bar socket optionally by means of a plastics material pin or after 180° rotation by means of a clamping sleeve.

A similarly constructed toggle bar is known from Gw 911. In this toggle bar link, however, the narrower locking pin engages behind a fixed locking surface provided on the locking socket whilst the broader locking pin is secured in the corresponding other toggle bar socket by means of a detachable locking plate. The locking plate has two borings whereby an elastically deformable pin is arranged in one boring, around which the locking plate, made with a cam-like lug on the opposite side of the plate and engaging in the locked condition with a step, is rotated. A prong-like tool is used to rotate it, which is introduced into a pressed-out hole so that under elastic deformation of the pin the cam-like lug can be pressed out of the step and then turned out.

SUMMARY OF THE INVENTION

An aim of the present invention is to provide a toggle bar link which facilitates the cost effective production of pans and guideway pans including the associated elements for the toggle bar link.

Accordingly the present invention is directed to a toggle bar link as described in the opening paragraph of the present specification, in which the toggle bars and/or the securing elements each have a first and a second plane of symmetry in which they are symmetrically formed and/or the toggle bar sockets have a first plane of symmetry in which they are formed and a second plane of symmetry in which they are arranged symmetrically on the pans of abutting pans.

In contrast to the previously proposed constructions, where a multiplicity of different, variously constructed individual components were required for the production of the toggle bar links, for the toggle bar link according to the present invention only three different parts are necessary, namely a crossbar shape, a toggle bar socket form and a securing element form. Furthermore, owing to the symmetrical construction of the individual elements, it is not possible that, for instance, the toggle bar is assembled incorrectly in the toggle bar socket, that underground in a repair of the conveyor pans the wrong toggle bar socket is incorrectly assembled to the conveyor pan side walls or even that the securing elements are fitted the wrong way round. The present invention especially comprises that the toggle bar, owing to its strictly symmetrical form, can be inserted in the toggle bar socket independently of its orientation, the securing elements can be assembled for securing the toggle bar in the toggle bar socket independently of their orientation, and all the toggle bar sockets are constructed identically to each other.

With regard to the toggle bar for the toggle bar link according to the present invention it is advantageously provided that the first toggle bar plane of symmetry runs through the centre of the shaft between the toggle bar heads and the second plane of symmetry runs along the shaft and centrally through the toggle bar heads and the locking lugs, and further that the toggle bar heads and also the locking lugs are constructed mirror symmetrical to two planes of symmetry lying vertically to each other. The assembly of the toggle bar according to the present invention is made easier if the shaft has a waist located centrally between the shaft heads. This can not only serve as a gripping surface, but also in an advantageous manner eases the insertion of the toggle bar into the toggle bar sockets of pans abutting each other.

So that the toggle bar on the one hand can be distinguished in respect of production engineering by simple construction and on the other is able to accept without difficulty the demands of bending, pressure, tension and shear, the toggle bar has, symmetrically to the second plane of symmetry, a toggle bar head in each case and tapers continuously from the first plane of symmetry or the toggle bar heads outwards and downwards. To limit the amount by which two abutting conveyor pans can be pulled apart in the axial direction, the toggle bar heads can taper conically towards the shaft by means of inclined shoulder surfaces, whereby they co-operate advantageously with correspondingly formed inclined abutment shoulders in the toggle bar socket side walls. It is further provided in accordance with the present invention that the locking lugs and locking heads on both shaft ends are formed identically to each other.

In the toggle bar sockets for the aforesaid toggle bar link and toggle bar it is advantageously provided that the first axis of symmetry runs longitudinally through the socket cut-out and the socket cut-out has a channel section to the front, i.e. opening to the pan joint and widening for the acceptance of the toggle bar shaft, a head cut-out to accept the toggle bar head and a locking section open to the rear and narrowed by wall sections. The corresponding toggle bar socket has not only a simply realised construction from the production engineering standpoint, but also offers sufficient space for the assembly of the toggle bar and for the assembly of the securing elements. For an especially simple assembly of the securing elements, the side parts of the toggle bar socket can be provided with preferably notched or pressed accepting slots under the wall sections to accept the securing elements, so that the forces occurring during movement of the conveyor pans, including those through the wall shoulders, which are engaged by the securing elements, are taken up. It is further provided for the assembly of the securing elements that the wall projections all have cut-outs preferably semi-circular in cross-section open to the socket cut-out. Owing to the symmetrical construction of the socket cut-out the cut-outs of both toggle bar socket parts lie opposite each other at a distance. The construction of the toggle bar sockets for the toggle bar link according to the present invention makes it possible for the toggle bar sockets to be made from cast parts. Alternatively they can be made as welded parts. Further, the toggle bar sockets can have a fastening rib for positive engagement in the intervening space between conveyor side profiles and/or for the welded connection with the conveyor central plates or conveyor side profiles, to the rear of the socket bases preferably only formed in the region of the channel cut-out. It is understood that for this purpose the fastening ribs are formed to correspond to those present on the conveyor pans, owing to the given geometry of the side cheeks and central plates.

Preferably, the securing elements for the toggle bar links according to the present invention comprise an elongate plate, which has two holes arranged symmetrically to the centre line of the plate to accept detachable, deformable securing bolts which can be keyed into the cut-outs of the socket cut-outs. The symmetrical construction of the securing elements here also prevents the possibility of their being fitted the wrong way around. The assembly of the securing elements can be effected by elastic deformation of the securing bolts. It is, however, advantageously provided that the holes are provided with counterbores on each side of the plate surface, so that not only is the deformation of the securing bolts made easier, but also, because of the geometry of the counterbores, the securing bolts can be completely pushed into the holes only after correct positioning of the securing elements.

Disassembly of previously proposed securing elements was troublesome. An advantageous form of construction of the securing elements therefore provides that the locking plate has at least two borings arranged between the holes for the engagement of indexing noses of a disassembly tool, so that the use of an easily operated disassembly tool is possible. An assembly tool for the toggle bar link according to the present invention has a hand grip and a tool plate, whereby the handgrip is arranged on one side of the tool plate and indexing noses on the other. The present invention can also be embodied in conveyor pans or guideway pans for toggle bar links, in which all the toggle bar sockets provided on the pushing edges of the pans are constructed identically to each other.

BRIEF DESCRIPTION OF THE DRAWINGS

A preferred embodiment of the present invention will now be described, with reference to the accompanying drawings, in which.

DESCRIPTION OF THE PREFERRED EMBODIMENT

Figure 1:
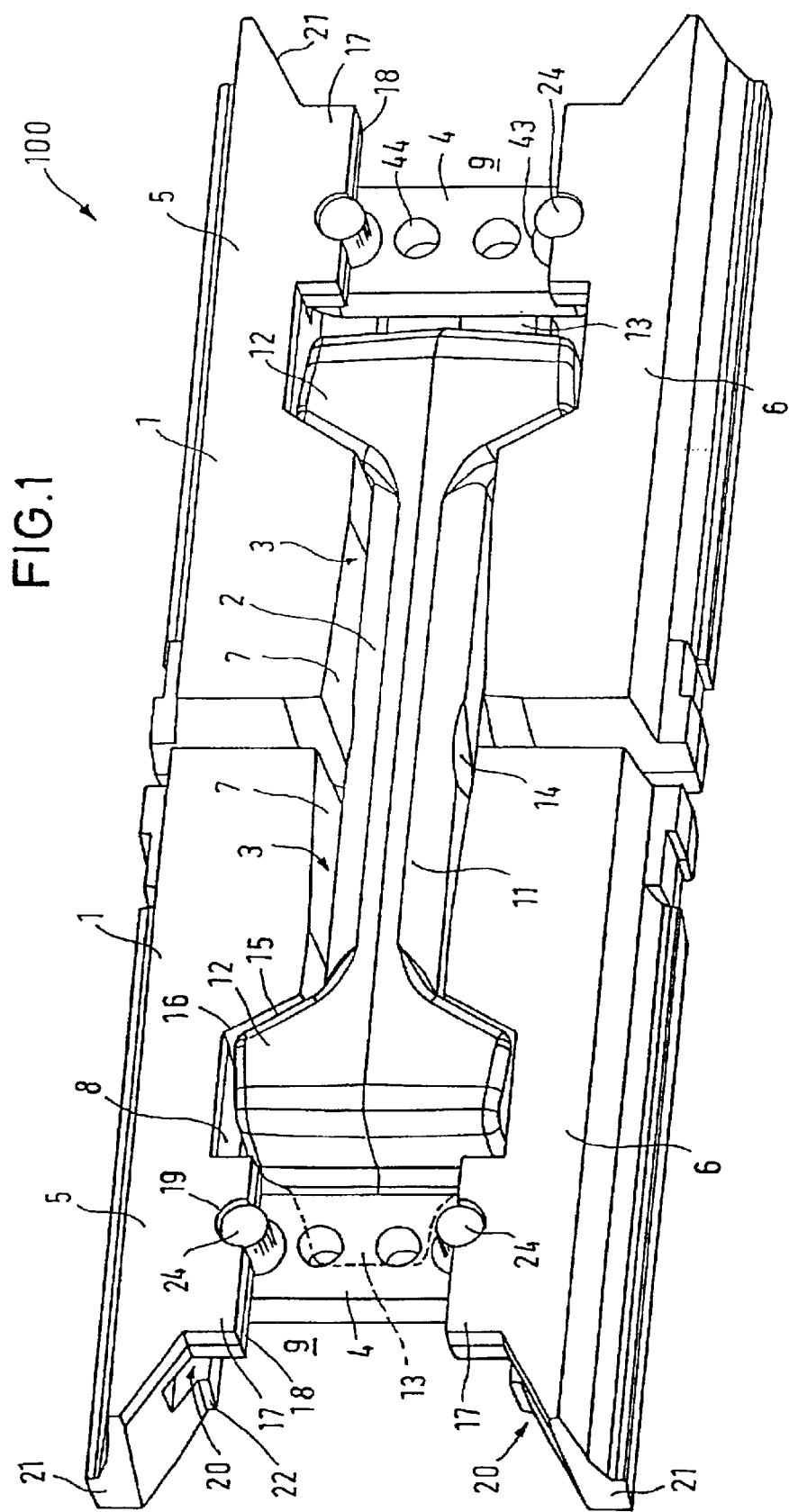
FIG. 1 shows a schematic perspective view of a toggle bar link according to the invention, with toggle bar head, two toggle bar sockets and two securing elements.
Figure 2:
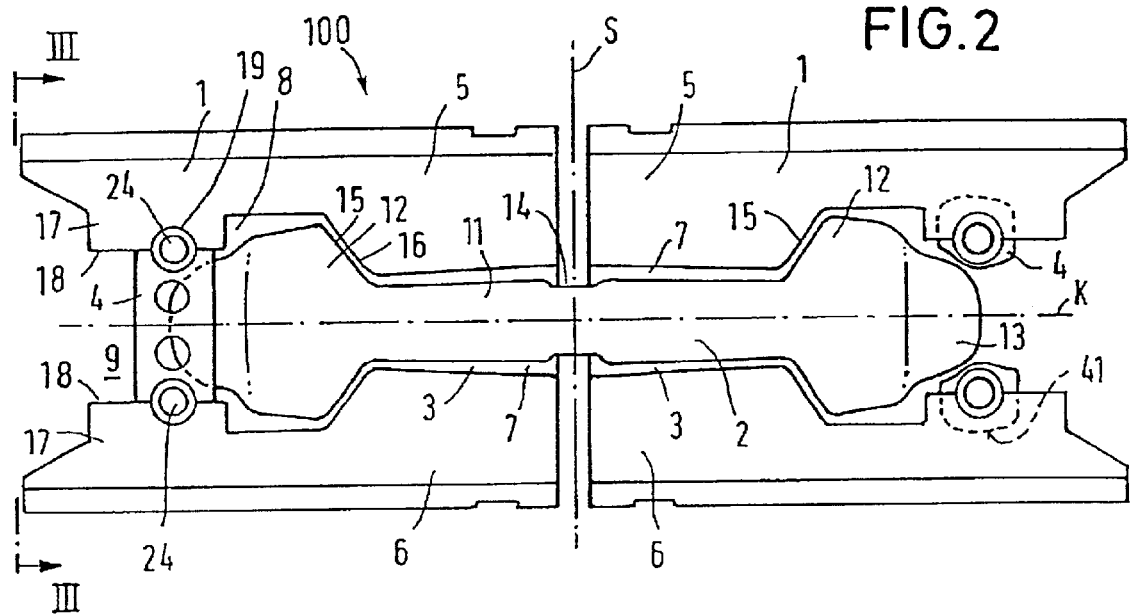
FIG. 2 shows a schematic plan view of the toggle bar link of FIG. 1.
Figure 3:
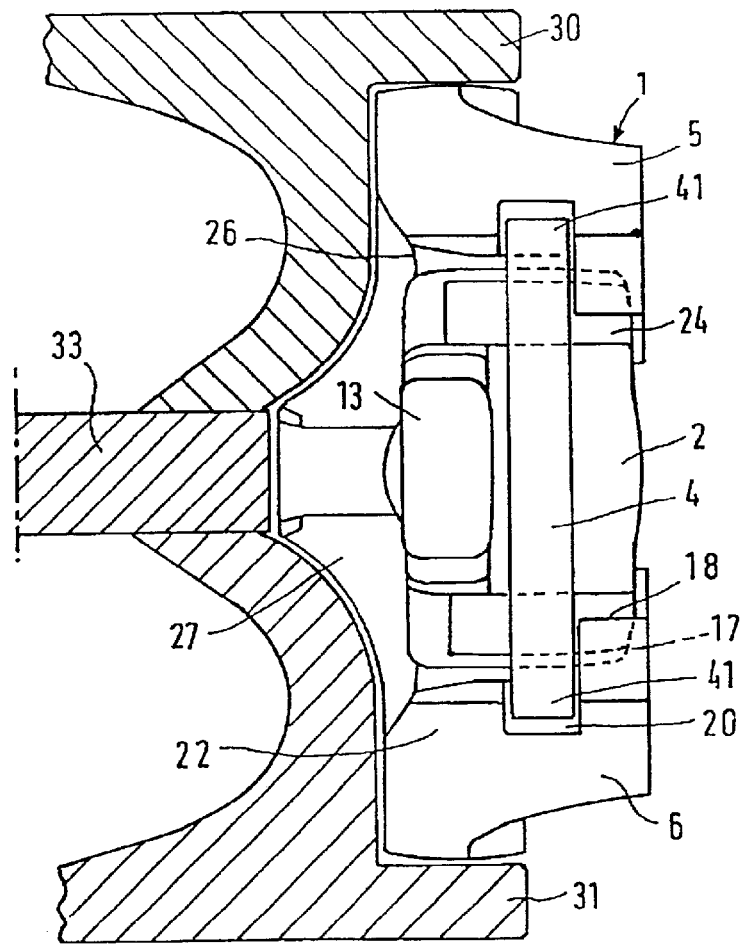
FIG. 3 shows a view corresponding to the line III—III in FIG. 2, whereby the toggle bar link is shown assembled to one of the conveyor pans.

FIGS. 1, 2 and 3 show a complete toggle bar link 100 for the coupling of two conveyor pans. The toggle bar link 100 is formed from two toggle bar sockets 1, identically constructed and assembled to the coupling ends of the conveyor pans as mirror images of each other, a single piece toggle bar 2 and two locking plates 4, with which the toggle bar 2 is secured against falling out to the side within the toggle bar socket cut-outs 3 of the toggle bar sockets 1. The toggle bar sockets 1 are assembled mirror-symmetrically to the plane of symmetry S and to the conveyor pans at the side, so that the toggle bar 2 is inserted from the side into the socket cut-outs 3 which are open to the sides. The toggle bar sockets 1 have two toggle bar socket side parts 5, 6, which are arranged mirror-symmetrically to the first toggle bar socket plane of symmetry K (FIG. 2), and between which the socket cut-outs 3 are formed, and which are only joined together at the socket base 26 (FIG. 3) as will be explained. The socket cut-outs 3 have each a channel section 7, a head section 8 and a securing section 9.

The single piece toggle bar 2, inserted sideways in the toggle bar sockets, comprises a shaft 11, two toggle bar heads 12 and two relatively flat, tongue shaped locking lugs 13, which are formed in each case on the sides of the toggle bar heads 12 lying opposite to the shaft 11 and have a smaller height than the toggle bar heads 12. The toggle bar 2 has, as shown in FIG. 2, two planes of symmetry, namely the plane of symmetry K and the plane of symmetry S, which collapses at the pan boundary between the two conveyor pans (not shown). The two locking lugs 13 are, like the toggle bar heads 12, constructed identically to each other. The shaft joining the two toggle bar heads 12 in one piece is narrower than the toggle bar heads 12 in height and also in width and has indentations 14 on its sides midway between the heads 12. The toggle bar heads 12 taper continuously on the sides away from the shaft 11 and end in the locking lugs 13. In the linked condition shown in FIG. 1 and FIG. 2 the shaft 11, the toggle bar heads 12 and the locking lugs 13 of the toggle bar 2 are enclosed with play in the channel section 7, the head cut-out 8 and the locking section 9 of the socket cut-out 3, so that the linking of the conveyor pans retains angular mobility in the horizontal and vertical planes. The shoulder surfaces 15 in the transitional region between the toggle bar heads 12 and the shaft 11 are formed as conically converging, inclined support surfaces which can be supported on corresponding abutment surfaces 16 in the head cut-outs 8 of the socket cut-outs 3, so that the amount by which the conveyor pans can be pulled apart at the joints is limited.

The toggle bar 2 lying inside the socket cut-outs 3 in the linked condition is secured in position by means of the locking plates 4 in the locking sections 9 of the socket cut-outs 3. The locking section 9 is formed between two wall projections 17, which on their faces 18 facing towards the locking section 9 are provided with cut-outs 19, semi-circular in cross section, and open to the locking section 9.

Beneath the wall projections 17 extending from the side parts 5, 6 of the toggle bar socket, accepting slots 20 are formed, preferably notched or pressed, into which the locking plates 4 can be inserted from the side, open ends 21 of the toggle bar sockets 1. The locking plates 4 then engage behind the wall projections 17 and engage in front of wall ribs 22, which limit the accepting slot 20 down to the socket base. In the locking position shown in FIGS. 1, 2 and 3 the locking plates 4 also engage in front of the locking lugs 13 of the toggle bar 2, so that the toggle bar 2 is secured against falling out of the socket cut-out 3 which are open to the side. For clarity the right-hand locking plate 4 in FIG. 2 is shown cut away. To retain the locking plates 4 in the secure position, they have two borings 42, matching the cut-outs 19, into which securing bolts 24, of flexible plastics material or hard plastics material, are inserted.

FIG. 3 shows the toggle bar socket 1 with the toggle bar 2 inserted and the locking plate 4 assembled in the locking section 9 of the socket cut-outs 3, in a side view. The two rounded ends 41 of the locking plate 4 engage with play in the accepting slot 20 between the wall projections 17 and the wall ribs 22, and in front of the locking lugs 13, so as to secure the toggle bar 2 against falling out to the side from the socket cut-outs 3. In the other direction the toggle bar 2 is supported against a socket base 26, which forms the link between the two toggle bar socket side parts 5, 6 and preferably is only formed in the region of the channel section 7 (see FIGS. 1 and 2). The socket base 26 is formed on the rear side as a contact rib 27, whose contour is matched to the cross section of the opening between the side profiles 30, 31 and the central base sheet 33 of the conveyor pans. The fastening rib 27 therefore facilitates the central positioning of the toggle bar sockets 1 on the outer wall of the conveyor pans, so that the toggle bar sockets 1 can be welded to the conveyor pans in a simple manner.

Figure 4:
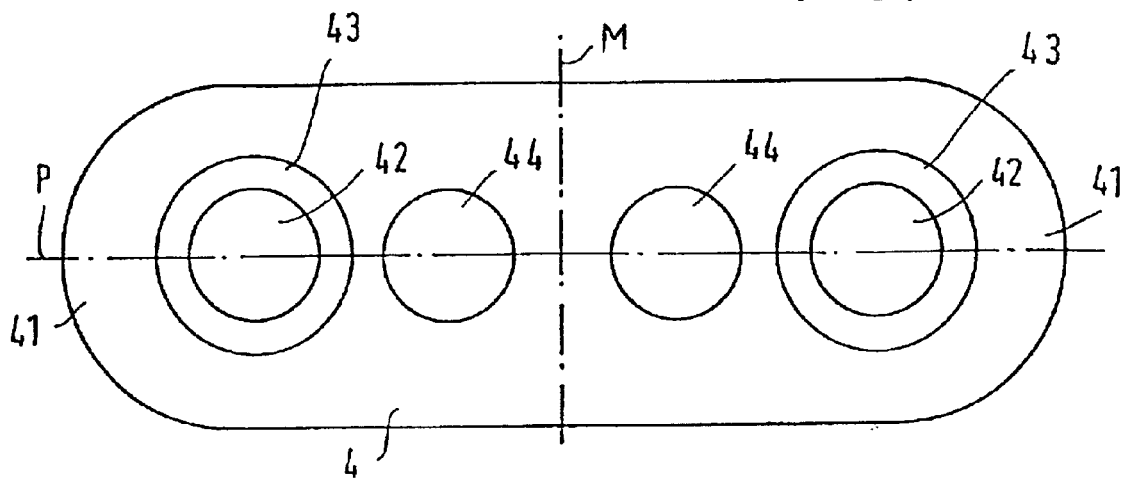
FIG. 4 shows a plan view of one of the securing elements of FIG. 1.

FIG. 4 shows the locking plate 4 in detail. The flat shaped, elongate basic body is symmetrical both to the central plane P of the plate and to the central plane M and has four borings, of which the outer borings 42, furthest from the central plane M, are each provided with counterbores 43, and between these borings 42 two further borings 44, are arranged axially symmetrical to the planes of symmetry M, P. The outer borings 42 can have a grooved, ribbed or roughened edge to their circumference so as additionally to secure the securing bolts 24 against falling out. The counterbores 43 facilitate the assembly of the locking plates 4.

Figure 5:
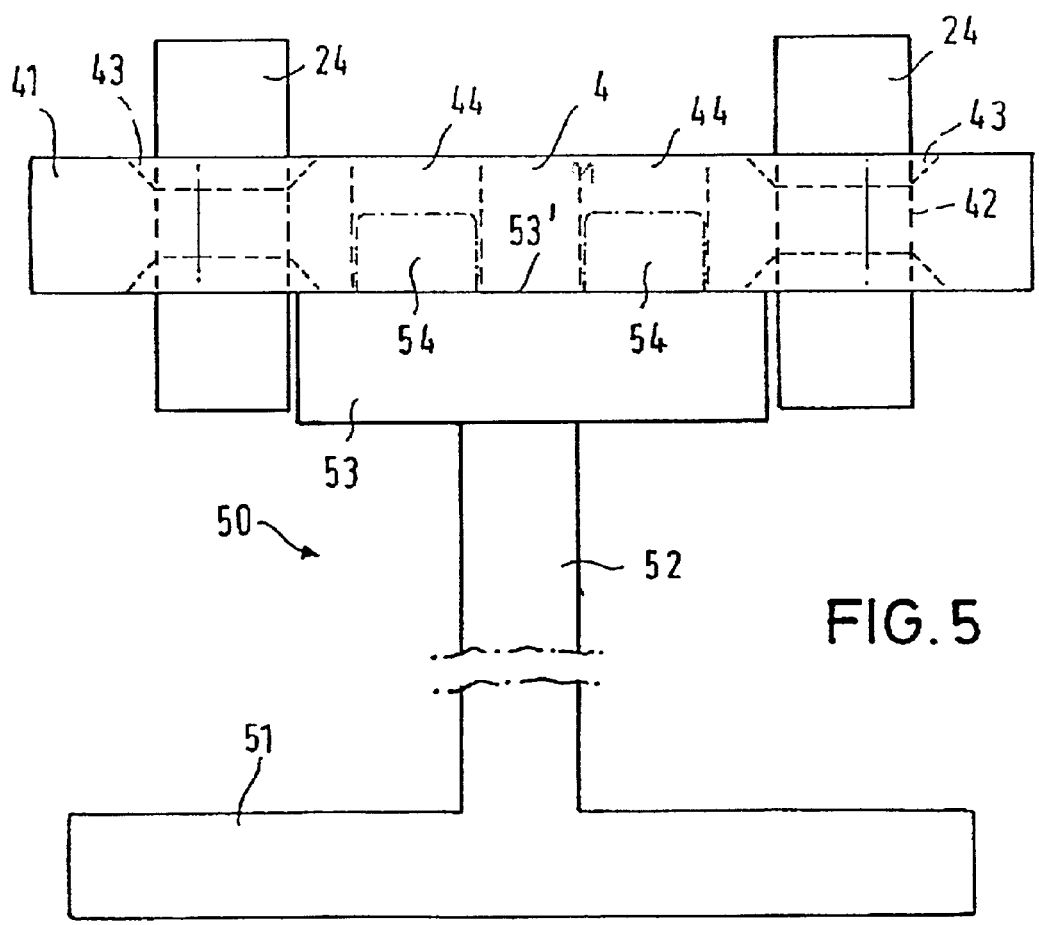
FIG. 5 shows a side view of the securing element of FIG. 4 together with an assembly tool and an inserted securing bolt.

The assembly of the locking plates 4 can be effected in various ways. Assembly and disassembly can each be undertaken with the aid of the assembly tool 50 shown in FIG. 5, which has a handgrip 51, a shank 52 of suitable length and a tool plate 53, which is provided with two indexing noses 54 on the tool plate side 53'. The shape of, and separation between, the indexing noses 54 is matched to the shape and separation of the borings 44, so that the borings 44 can engage with the assembly tool 50. In order to bring the locking plate 4 into the securing position shown in FIGS. 1, 2 and 3, firstly only one securing bolt 24 is inserted into one of the two outer borings 42, so that the locking plate 4 can be rotated about one of the two cut-outs 19 into its locking position and then the second securing bolt 24 is inserted into the other matching boring 42. However, owing to the flexibility of the securing bolts and because of the increased possibility of deformation of the securing bolts 24 due to the counterborings 43, it is also possible to assemble the locking plate 4 using both inserted bolts 24. To this end, with the aid of the tool 50 shown in FIG. 5, the locking plate 4 is introduced from the open end 21 of the toggle bar socket 1 at an angle of 15° to 45° into the accepting slot 20 until one of the two securing bolts 24 engages in the cut out 19. Then the locking plate is turned until the second securing bolt 24 engages in the cut-out 19 on the opposite wall projection 7. During the rotation of the locking plate 4 the two securing bolts 24 are bent towards each other until the securing element 4 reaches its locking position. In this position the securing bolts 24 position themselves with their central axes again vertical to the plane of the plate, so that the locking plate 4 cannot come free from the securing position without the aid of a disassembly tool. The disassembly of the locking plate 4 is effected in the corresponding reverse order.

As already described above, it is especially favourable in the toggle bar link according to the present invention that the toggle bar 2, the toggle bar sockets 1 and the locking plates 4 are intrinsically symmetrical so that the adjacent toggle bar sockets 1, 1 are always constructed identically to each other. For the assembly and disassembly of the toggle bars 2 both securing elements 4 could possibly be loosened. However it is sufficient that only one of the two securing elements 4 is loosened for assembly and disassembly, since the socket base 26 is only formed in the channel section 7 and consequently one toggle bar head 12 of the toggle bar 2 can be introduced at an angle into the head cut-out of the one toggle bar socket, so as then to be brought into the coupling position shown in FIGS. 1, 2 and 3.

What is claimed is:

1. A toggle bar link assembly for conveyor pans of conveyors, guideway pans of mining machine tracks and similar, the toggle bar link assembly comprising toggle bar sockets having at their ends an open locking section restricted by wall projections, each wall protection having an open cut-out, semi-circular in cross section, the toggle bar sockets being arranged at the sides of the pans, open to the side, which toggle bar sockets are provided with cut-outs in which a toggle bar having a shaft and two heads can be inserted, the heads being joined in one piece by the shaft which is smaller in cross section and each head having a locking lug such that the locking lugs secure the toggle bar in the toggle bar socket cut-outs by means of detachable securing elements, in which the toggle bar and the securing elements each have a first and a second plane of symmetry in which they are symmetrically formed, in which the toggle bar sockets have a first plane of symmetry in which they are formed mirror symmetrically, and a second plane of symmetry to which the pans, jointed to each other are arranged, and at abutment joints of the pans they are identical to each other.

2. The toggle bar link assembly according to claim 1, in which the toggle bar socket has side parts between the wall projections which are provided with notched acceptance slots for the acceptance of the securing elements.

3. The toggle bar link assembly according to claim 1, in which the toggle bar socket has side parts between the wall projections which are provided with pressed acceptance slots for the acceptance of the securing elements.

4. The toggle bar link assembly according to any one of claim 1, 2 or 3 wherein the securing element has an elongate plate which has two holes symmetrically arranged to the central plane of the plate for the acceptance of detachable, deformable securing bolts which can index in the cut-outs of the socket cut-outs.

5. The toggle bar link assembly according to claim 4, in which the holes are provided with counterbores on both sides.

6. A conveyor pan equipped with a toggle bar link assembly, the toggle bar link assembly comprising toggle bar sockets having at their ends an open locking section restricted by wall projections, each wall projection having an open cut-out, semi-circular in cross section, the toggle bar sockets being arranged at the sides of the pans, open to the side, which toggle bar sockets are provided with cut-outs in which a toggle bar having a shaft and two heads can be inserted, the head being joined in one piece by the shaft which is smaller in cross section and each head having a locking lug such that the locking lugs secure the toggle bar in the toggle bar socket cut-outs by means of detachable securing elements, in which the toggle bar and the securing elements each have a first and a second plane of symmetry in which they are symmetrically formed, in which the toggle bar sockets have a first plane of symmetry in which they are formed mirror symmetrically, and a second plane of symmetry to which the pans, jointed to each other are arranged, and at abutment joints of the pans they are identical to each other.

7. A guideway pan equipped with a toggle bar link assembly, the toggle bar link assembly comprising toggle bar sockets having at their ends an open locking section restricted by wall projections, each wall projection having an open cut-out, semi-circular in cross section, the toggle bar sockets being arranged at the sides of the pans, open to the side, which toggle bar sockets are provided with cut-outs in which a toggle bar having a shaft and two heads can be inserted, the head being joined in one piece by the shaft which is smaller in cross section and each head having a locking lug such that the locking lugs secure the toggle bar in the toggle bar socket cut-outs by means of detachable securing elements, in which the toggle bar and the securing elements each have a first and a second plane of symmetry in which they are symmetrically formed, in which the toggle bar sockets have a first plane of symmetry in which they are formed mirror symmetrically, and a second plane of symmetry to which the pans, jointed to each other are arranged, and at abutment joints of the pans they are identical to each other.

* * * * *